United States Patent
Guffarth et al.

(10) Patent No.: US 11,752,953 B2
(45) Date of Patent: Sep. 12, 2023

(54) CAMERA SYSTEM FOR MOUNTING ON A VEHICLE

(71) Applicant: ZF Friedrichshafen AG, Friedrichshafen (DE)

(72) Inventors: Christian Guffarth, Friedrichshafen (DE); Johannes Kirchhoff, Friedrichshafen (DE); Alex Hessel, Friedrichshafen (DE); Albertus Clemens Maria Van der Knaap, Eindhoven (NL); Steven Vanderhaeghen, Eindhoven (NL); Michiel Van Nesselrooij, Eindhoven (NL)

(73) Assignee: ZF Friedrichshafen AG, Friedrichshafen (DE)

( * ) Notice: Subject to any disclaimer, the term of this patent is extended or adjusted under 35 U.S.C. 154(b) by 258 days.

(21) Appl. No.: 17/312,748

(22) PCT Filed: Dec. 9, 2019

(86) PCT No.: PCT/NL2019/050813
§ 371 (c)(1),
(2) Date: Jun. 10, 2021

(87) PCT Pub. No.: WO2020/122708
PCT Pub. Date: Jun. 18, 2020

(65) Prior Publication Data
US 2022/0048443 A1    Feb. 17, 2022

(30) Foreign Application Priority Data
Dec. 10, 2018  (NL) ...................................... 2022162

(51) Int. Cl.
*B60R 11/04* (2006.01)
*B60R 1/06* (2006.01)
*B60R 1/12* (2006.01)

(52) U.S. Cl.
CPC ............ *B60R 11/04* (2013.01); *B60R 1/0617* (2013.01); *B60R 2001/1253* (2013.01); *B60R 2001/1261* (2013.01); *B60R 2300/804* (2013.01)

(58) Field of Classification Search
CPC .................. B60R 11/04; B60R 1/0617; B60R 2001/1253; B60R 2001/1261; B60R 2300/804
See application file for complete search history.

(56) References Cited

U.S. PATENT DOCUMENTS

| 2017/0210297 A1* | 7/2017 | Kim ....................... G01S 17/931 |
| 2017/0282982 A1* | 10/2017 | Nagasawa .............. B62D 37/02 |
| 2018/0037267 A1* | 2/2018 | Williams .............. G01S 7/4813 |

FOREIGN PATENT DOCUMENTS

| WO | WO 2017/178859 A1 | 10/2017 |
| WO | WO 2017/196165 A1 | 11/2017 |

OTHER PUBLICATIONS

International Search Report and Written Opinion of the International Search Authority dated Jan. 20, 2020 in International Application No. PCT/NL2019/050813 (English and German languages) (9 pp.).

\* cited by examiner

*Primary Examiner* — Howard D Brown, Jr.
*Assistant Examiner* — Tyler B Edwards
(74) *Attorney, Agent, or Firm* — Crowell & Moring LLP

(57) ABSTRACT

Camera system (200) arranged for mounting on a vehicle's front side location (110), equipped to provide at least an image of the area in front of the vehicle (100), comprising a wing assembly (120) arranged for mounting on the vehicles front side location (110) and a forward looking camera (130) mounted in the wing assembly (120), the wing assembly (120) having a front portion (123*f*) shaped around and extending in front of a transparent camera portion (130*t*) that forms the front side (120*f*) of the forward looking camera (130), so that the transparent camera portion (130*t*) forms a smooth and continuous surface with the front portion (123*f*); wherein the front portion (123*f*) extends forward beyond the transparent camera portion surface (130T), so that a curved guidance surface is formed by the front portion (123*f*) that redirects impacting travel wind (F2) from the front portion (123*f*) to a downward direction along the transparent camera portion (130*t*) to keep it free from contamination.

20 Claims, 14 Drawing Sheets

Fig. 2
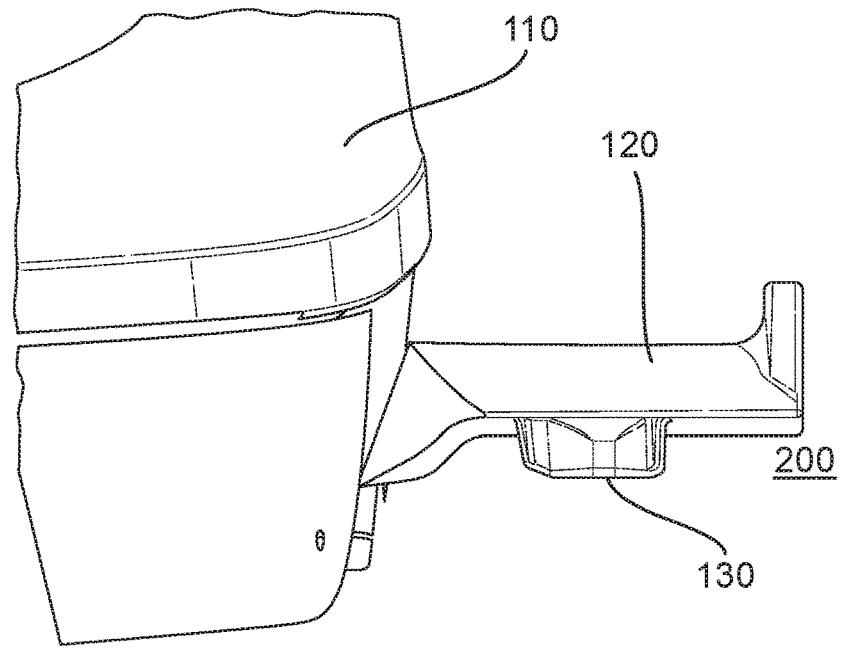
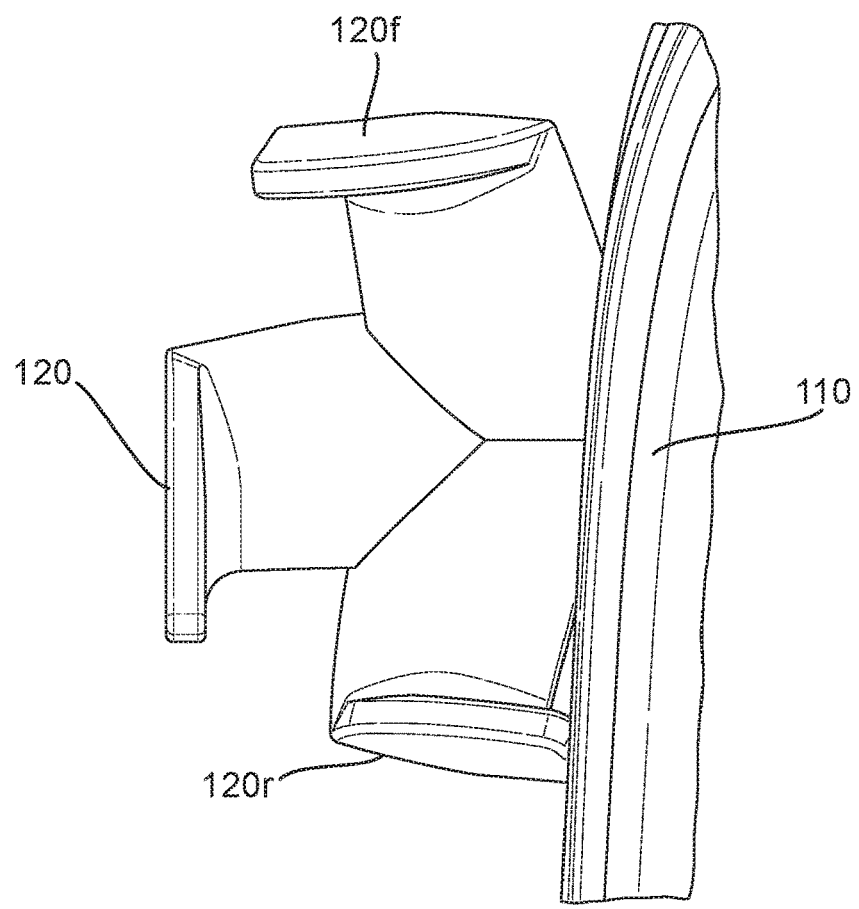

Fig. 4
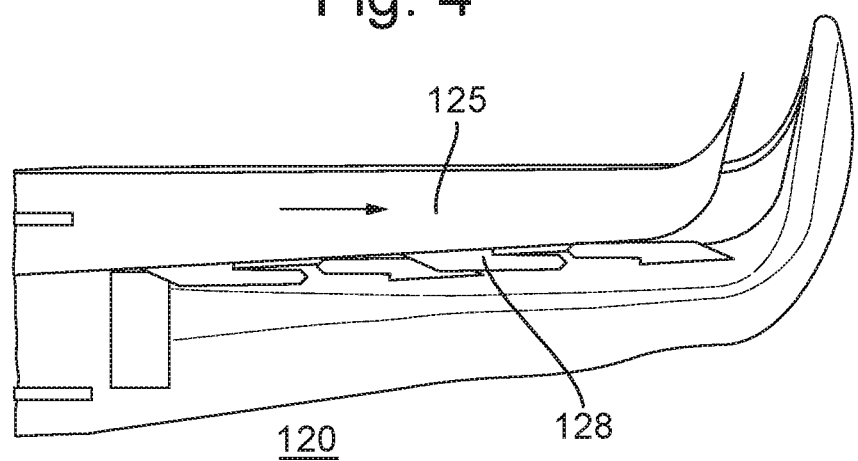
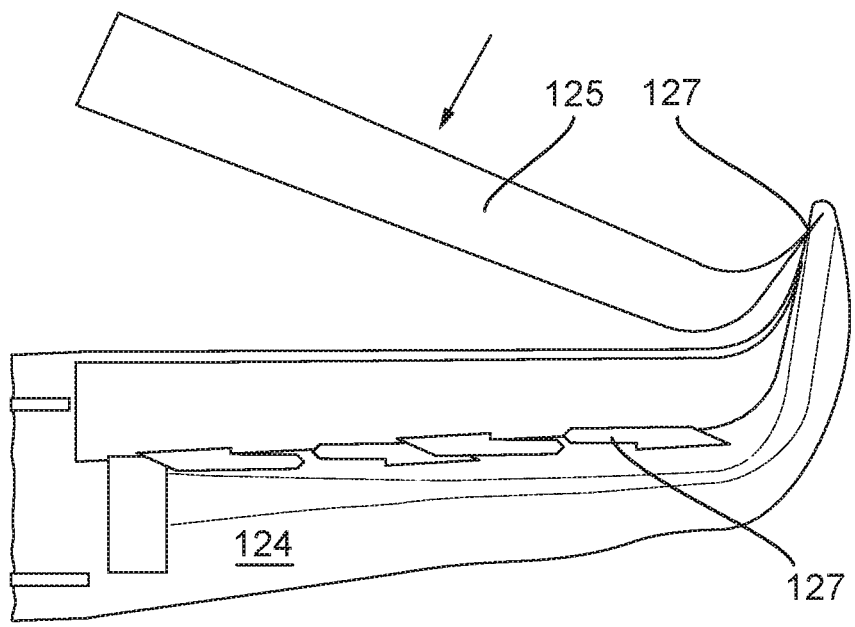
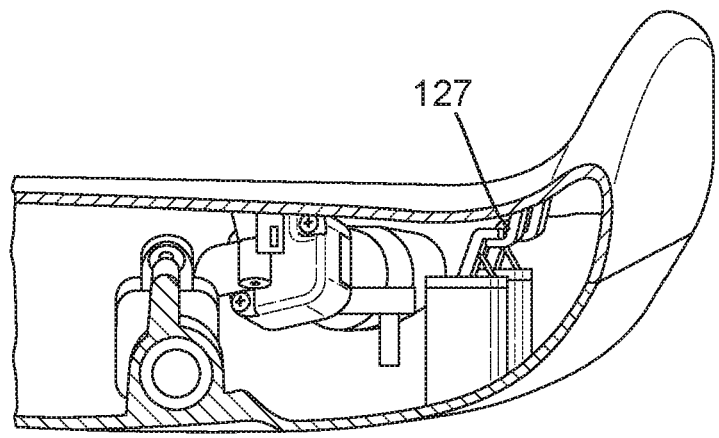

Fig. 7
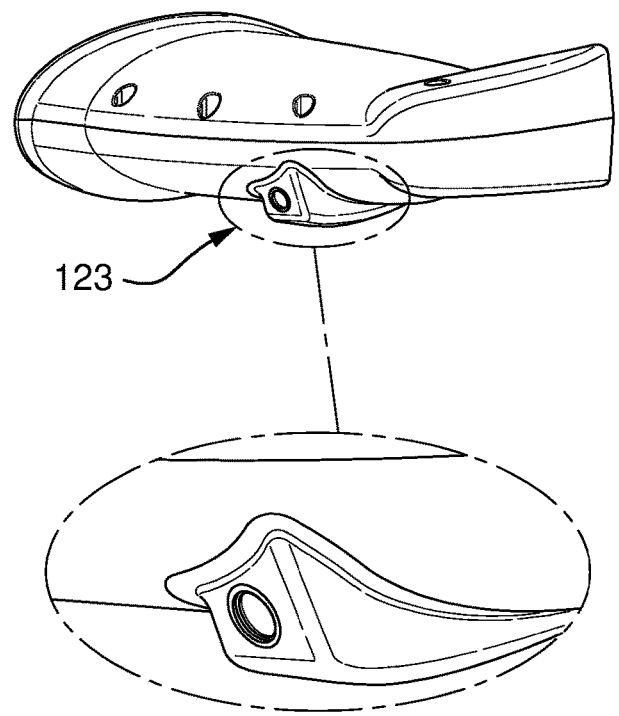
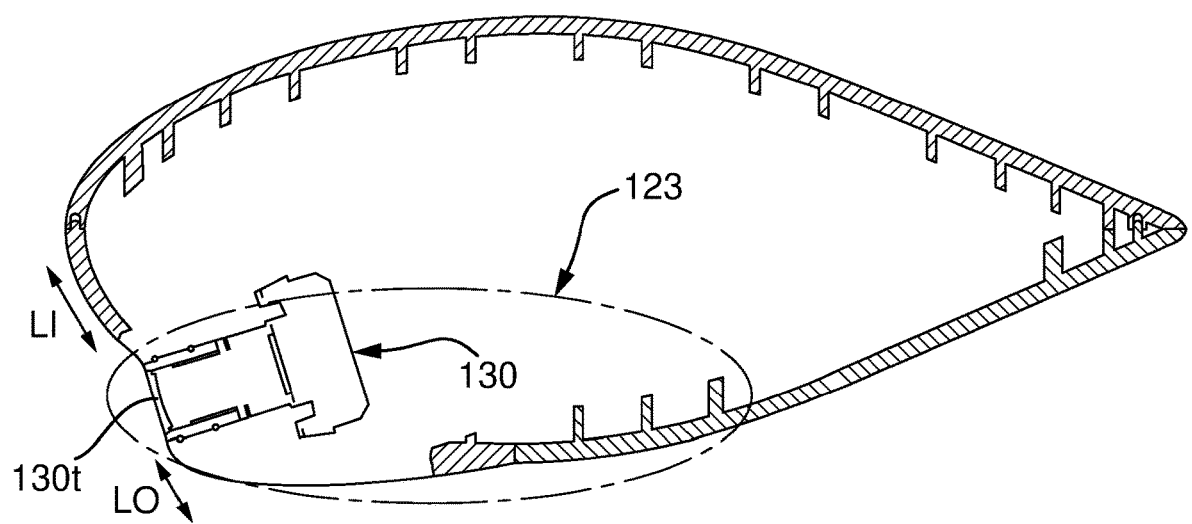

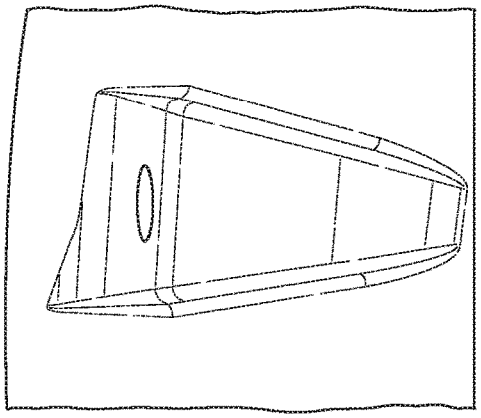
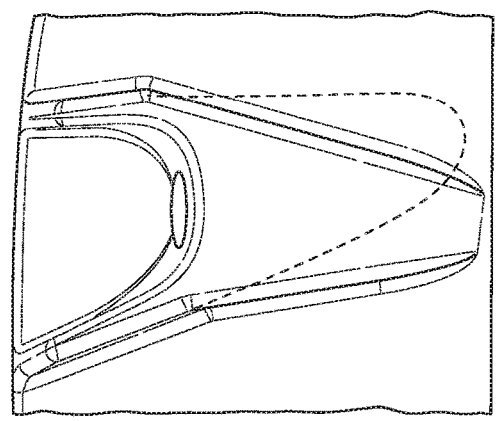
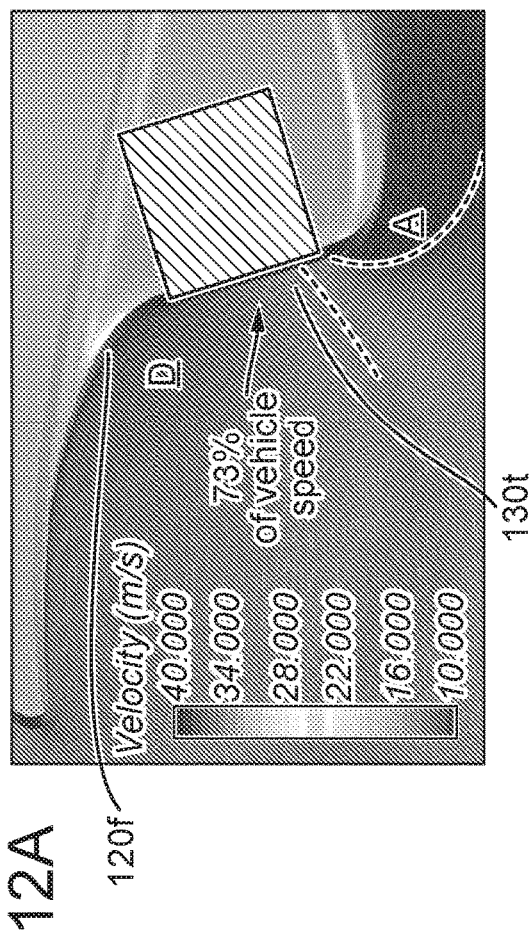
Fig. 12A
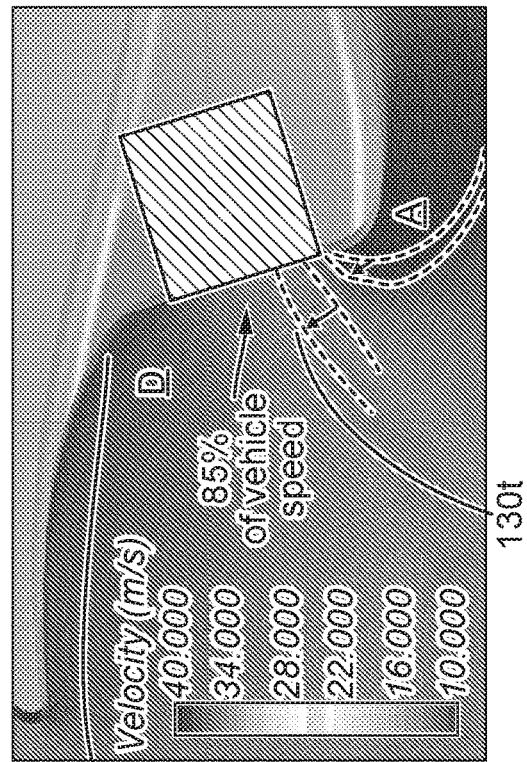
Fig. 12B

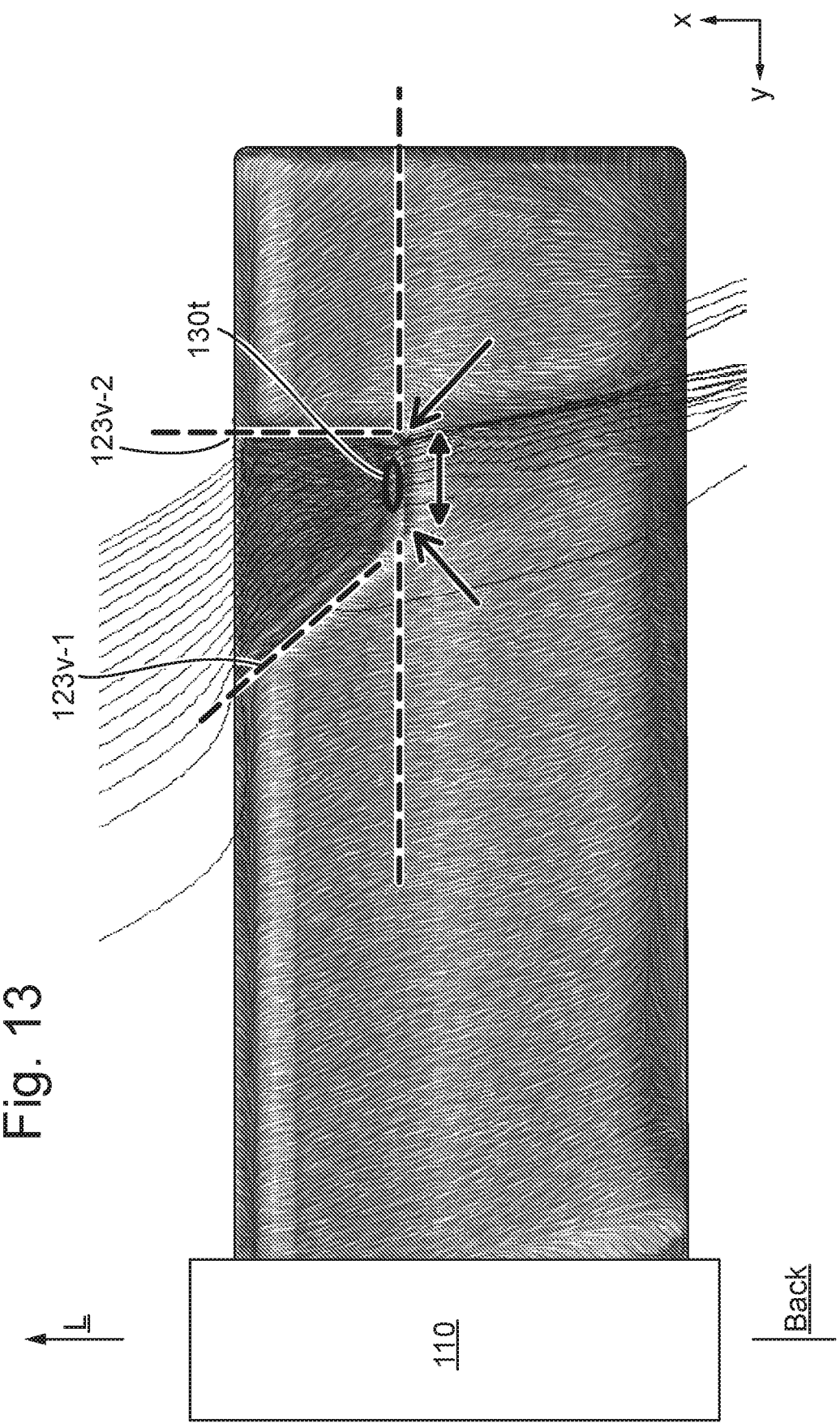

CAMERA SYSTEM FOR MOUNTING ON A VEHICLE

RELATED APPLICATIONS

This application is a filing under 35 U.S.C. § 371 of International Patent Application PCT/NL2019/050813, filed Dec. 9, 2019, and claiming priority to the Netherlands Patent Application 2022162, filed Dec. 10, 2018. All applications listed in this paragraph are hereby incorporated by reference in their entireties.

TECHNICAL FIELD

The present disclosure relates to a camera system arranged for mounting on a vehicle's front side location, equipped to provide an image of the area and objects that are present in this area in front of the vehicle in particular, for use in platooning of heavy trucks.

BACKGROUND

Platooning, i.e. driving in convoy by two or more trucks, such as trailer truck combinations, substantially increases the fuel efficiency of trucks and relieves the burden for the driver with respect to this highly precise steering and responsible system monitoring task with reduced vision on the road due to short the distance of the vehicle that is followed. Furthermore (road) safety is enhanced as the human factor is diminished or completely eliminated and road usage (meaning more truck-trailers per road length sections) is maximized by short distance driving. Last but not least driver effectiveness can be improved as the driver can do other tasks like administration, resting, etc. during the journey in case of autonomous driving mode. Platooning is the basis for new future automated logistic transport concepts. There is high need to develop and optimize these systems.

One of the many challenges is the limited view, even for camera sensing systems, in order to provide a reliable platooning control system of two trucks following each other at close distance, e.g. less than 15 meters, or even less than 5 meters. This requires a vehicle following control system with response times that are significantly below the human reaction times which is in the range of 1 to 1.5 sec depending on the (trained) skills and alertness level of the driver. State-of-the-art in Advanced Driver Assistance Systems (ADAS), where platooning is part of, applied on-board sensor systems such as cameras and radars have latency times ranging from 200 to 500 ms.

These delay times limit further minimization of vehicle following distance; however: the smaller the inter distance between the following vehicles, the higher the platooning benefit is in terms fuel economy, road use and traffic safety. E.g. the risk of cut-ins by other road users is reduced. To compensate for sensor related 'sluggish' response of the Adaptive Cruise Control (ACC) based vehicle following control systems, vehicle-to-vehicle (V2V) communication is installed. These V2V signals are used to wirelessly (e.g. via WiFi-p) transmit actual vehicle states such as acceleration, deceleration and may be even steering angles from the predecessor to the following vehicles. In this way feed forward information is provided in addition to the basic ACC system in the following vehicle, effectively establishing a fast reacting platooning control system that allows for short distance vehicle following. In DE102015010535 a plurality of camera's is used for detecting an environment around a transport vehicle. In the arrangement, a central forward looking camera is provided in addition to side cameras monitoring a side range of the vehicle and (partly) replacing rear view mirror. One of the problems of a side camera, especially of the type of a forward mounted position, is that the camera is quite sensitive for moist and dirt accumulation, since it is oriented in the driving direction.

In PCT/NL2017/050285 a side mirror system is provided with forward looking cameras provided on the sides of a truck for the purpose of enhanced lane detection as input for the platooning control system.

There is a need to provide a camera system, especially for use in case of short distance vehicle following platooning applications in commercial vehicles as described in the aforementioned state-of-the-art, that is quite insensitive to wet conditions and dirt accumulation. It is known to clean the camera surface by wipers and washers (water spray) or alike parts, but these systems and its components are sensitive for malfunction over time. Moreover the packaging of these camera cleaning devices in the limited available space of camera units mounted at the sides of the vehicle is rather problematic which makes the overall construction complex and expensive. It is aimed to provide a robust, durable low cost solution for a camera mounting system.

BRIEF DESCRIPTION OF THE DRAWINGS

The present disclosure will be further elucidated in the figures:

FIG. 2 shows a detailed view of a camera system that is mounted with a hinge mount allowing for folding rearward and forward with respect to the vehicle body;

FIG. 4 shows an embodiment wherein the wing assembly has winglet and a top wing cover plate

FIG. 7 shows a second schematic cross section of a forward looking camera mounted in a wing assembly;

FIG. 12A shows a comparative wind speed profile without the venturi shape;

FIG. 12B shows a wind speed profile with the venture shape;

FIG. 13 shows a venturi profile without a protrusion, and side walls that are angled at different orientations;

DETAILED DESCRIPTION

Figure 1:
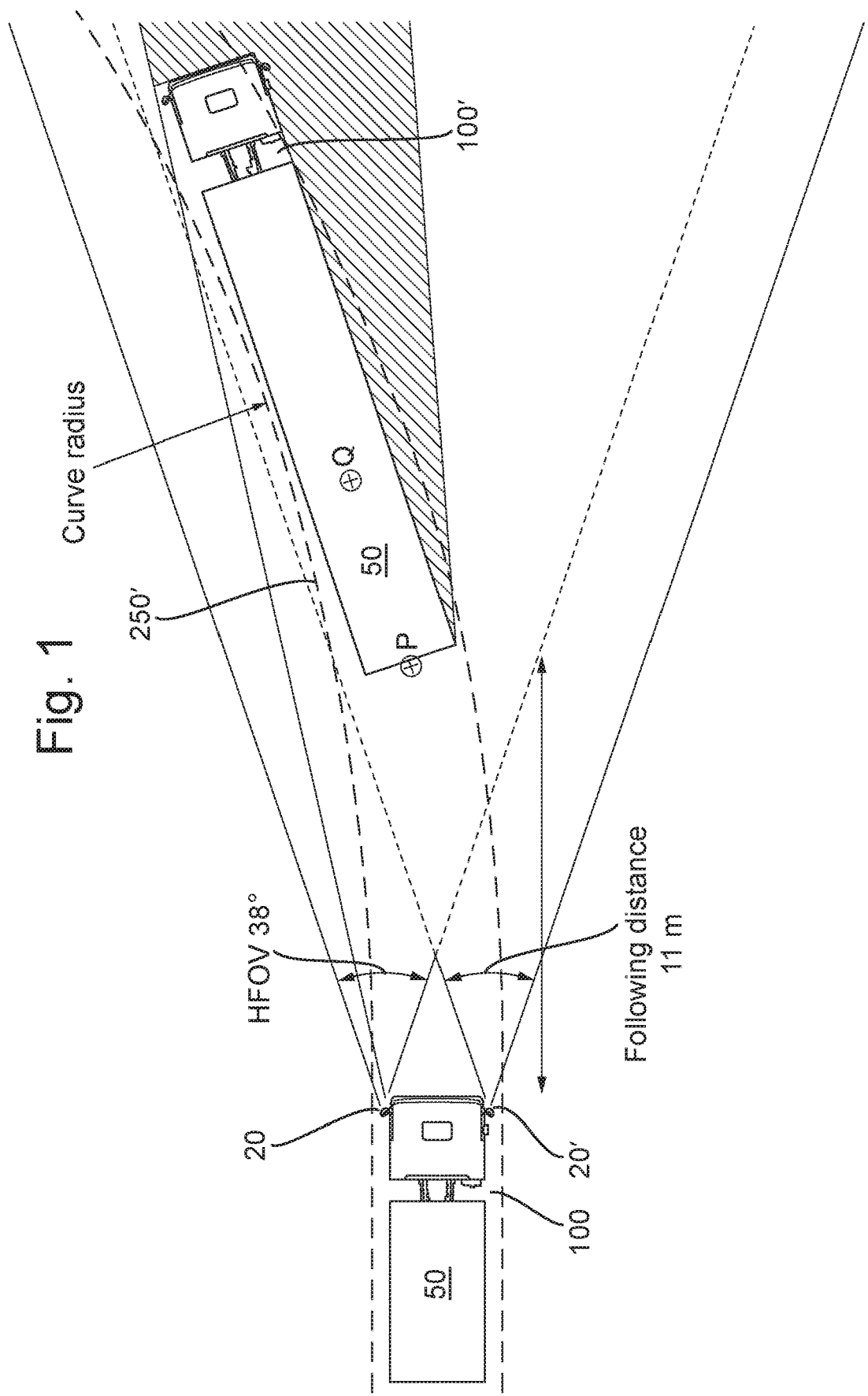
FIG. 1 shows a schematic setup of guiding of a motor vehicle on the basis of image data when (semi-)autonomously driving the motor vehicle in platooning formation following a leading vehicle.

Unless otherwise defined, all terms (including technical and scientific terms) used herein have the same meaning as commonly understood by one of ordinary skill in the art to which this disclosure belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the present disclosure. As used herein, the singular forms "a", "an" and "the" are intended to include the plural forms as well, unless the context clearly indicates otherwise. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

While example embodiments are shown for systems and methods, also alternative ways may be envisaged by those skilled in the art having the benefit of the present disclosure for achieving a similar function and result. E.g. some components may be combined or split up into one or more alternative components. Finally, these embodiments are intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as set forth in the claims that follow. The specification and drawings are accordingly to be regarded in an illustrative manner and are not intended to limit the scope of the appended claims.

According to an aspect, it is aimed to provide a camera system arranged for mounting on a vehicle's front side location, equipped to provide an image of the area in front of the vehicle. The camera system comprises a wing assembly arranged for mounting on the vehicles front side location and a forward looking camera mounted in the wing assembly. The wing assembly has a front portion shaped around and extending in front of a transparent camera portion that forms the front side of the forward looking camera, so that the transparent camera portion forms a smooth and continuous surface with the front portion. The front portion extends forward beyond the transparent camera portion surface, so that a curved guidance surface is formed by the front portion that redirects impacting travel wind from the front portion to a downward direction along the transparent camera portion to keep it free from contamination.

While the transparent camera portion is frontally opposed the general direction of the travel wind, the curved guidance surface resolves the otherwise direct impact of the travel wind on the forward looking camera. In this way still areas are prevented, that would, due to direct wind impact result in air speed close to the camera surface that would be too low to prevent dirt accumulation.

In FIG. 1 a camera setup is shown according to an embodiment of the present disclosure that refers to an improvement of the known state-of-the-art as described in PCT/NL2017/050285. This figure is illustrating that a motor vehicle 100 (equipped with the said improved camera set up) is driven in platooning formation following a trailer 50 of a leading vehicle 100'. The distance of the following vehicle to its predecessor may be automatically controlled via a so-called Cooperative Adaptive Cruise Control (CACC) that uses signals from on-board cameras and radars to measure the headway distance and received V2V communication messages transmitted by the lead vehicle and containing information on actual deceleration/acceleration to enhance the quality, accuracy and response time of said CACC system. Furthermore the driver can be supported in its steering actions to keep the vehicle in its actual lane by an active steering control means e.g. an electric actuator connected to the steering shaft in order to superimpose additional steering torques to the driver torque effectively helping the driver to keep the vehicle in its lane intuitively. These Advanced Driver Assist Systems (ADAS) may be referred to as Lane Keeping Assist (LKA). In other fully automated Platooning applications the drive may even take off its hands of the steering wheel. These systems may be referred to as Lane Keeping (LK). In this application the steering (and thus the course or lateral position of the following vehicle is solely controlled by the steering control system, automatically following the course (particularly relevant in case of lane changes) and stay within the desired lane of platooning in a fully autonomous manner. These Lane Keeping (Assist) methods comprise identifying the vehicle's current position relative to a lane side 250' by a forward looking camera 20 mounted in the wing assembly mounted on a vehicles first front side location, preferably at or on or near to the vehicles side mirror position. A further forward looking camera mounted in a wing assembly 20' is preferably mounted on the vehicles second front side location opposing said vehicles first front side location, relative to the vehicles length axis. The forward looking cameras 20, 20' may provide a reference lateral distance value to the steering controller relative to an observed first and/or second lane side. In this setup forward looking camera's 20, 20' define a dual camera basis larger than the vehicles width, i.e. first and second detectors are spaced apart over a distance equal or wider than the vehicle's width.

In the depicted embodiment, the forward looking cameras 20, 20' may be further equipped to provide an of image the leading vehicle located in front of the vehicle. The steering controller may thereby control the steering system to steer the vehicle according to reference value derived from said image which is particularly relevant for performing lane changes in the platoon as whole. The same camera can thus be used to determine the position of the trailer of the preceding vehicle in the platoon apart from determining its own lateral position with respect to the lanes which is important for stable feedback control of the lateral ego-motion in the sense of Lane Keeping. For longitudinal control, the proposed method has the advantage of providing a stereo camera view with a large base (distance between the cameras). The forward looking camera mounted in the wing assembly 20 can thus be equipped to image a reference point P at the back of the trailer of the leading vehicle 100' located at a forward distance. This is a distance typically much smaller than 15 m, typically about 5 to 10 meters. In this way a vehicle inter-distance or headway can be calculated relative to the leading vehicle in a stereo image derived from said opposed forward looking camera mounted in the wing assemblies 20, 20' and favorably be used to enhance the quality accuracy of the ACC based headway control system that uses a central middle camera and radar to measure the following distance as input. Depending on the technical implementation concept the middle camera and radar can even be eliminated and consequently completely be replaced by said two camera wing assemblies Point Q is a virtual point located on the road typically ranging between 10 m to 30 m (the exact value is a tuning parameter in the steering controller to influence the trade-off between yaw damping and turning agility while taking sharp corners) in front of the following vehicle and may be situated under the trailer of the predecessor or even in front of the predecessor. By using virtual point Q, roadhook control can be optimized aiming for a stable, but agile yaw motion vehicle behavior by detecting or calculating a further lateral distance from the observed freely visible lane side markers left and right of the leading vehicle relative to Q (consequently using this steering look ahead point information as input for the lane keeping control or assist system). Having the forward looking camera mounted in the wing assemblies mounted on a vehicles first front side location, preferably on the vehicles side mirror, provides an advantage of constant view, also in bending lanes, on at least one side of the lane side markers. The look ahead point Q, that is calculated virtually midway of the leading trailer is used for lateral road hook control error minimization, in addition to the lane side detection.

In FIG. 2 a more detailed view is given of a camera system 200 mounted on the vehicle's front side location 110. The camera system 200 comprises a wing assembly 120 and a forward looking camera 130 mounted in the wing assembly. The wing shaped assembly 120 can preferably be hinged in forward 120$f$ and rearward 120$r$ traveling directions. For example, in the extending operational position, the wing shaped assembly does not extend further than the reglementary side extension for the side mirrors, and can even form a part of it, or can be a separate assembly mounted in alignment with the side mirrors. Furthermore, the conventional side mirrors can even be replaced by the camera wing units when further backward and downward looking cameras are integrated in the assembly. These systems, referred to as "e-Mirrors" are equipped with displays in the vehicle compartment, typically at the location of the A-pillars to provide the driver with a view on the road near and extending back to the vehicle. Upon incidental impact, e.g. when a vehicle scrapes a wall or another vehicle, the hinge mount of the assembly rotates the wing assembly to a smaller extension, forward or rearward, depending on the impact direction. In another application the rotation of the wings may be actively adjusted by an hinge integrated motor device. In this case the driver does not need to climb outside his vehicle, which is particularly relevant for commercial vehicles where the wing assemblies are typically located at a distance 3-4 m above ground, to manually fold the mirrors towards the cabin for the purpose of narrow corridor maneuvering and/or close distance parking next to walls or other vehicles.

Figure 3A:
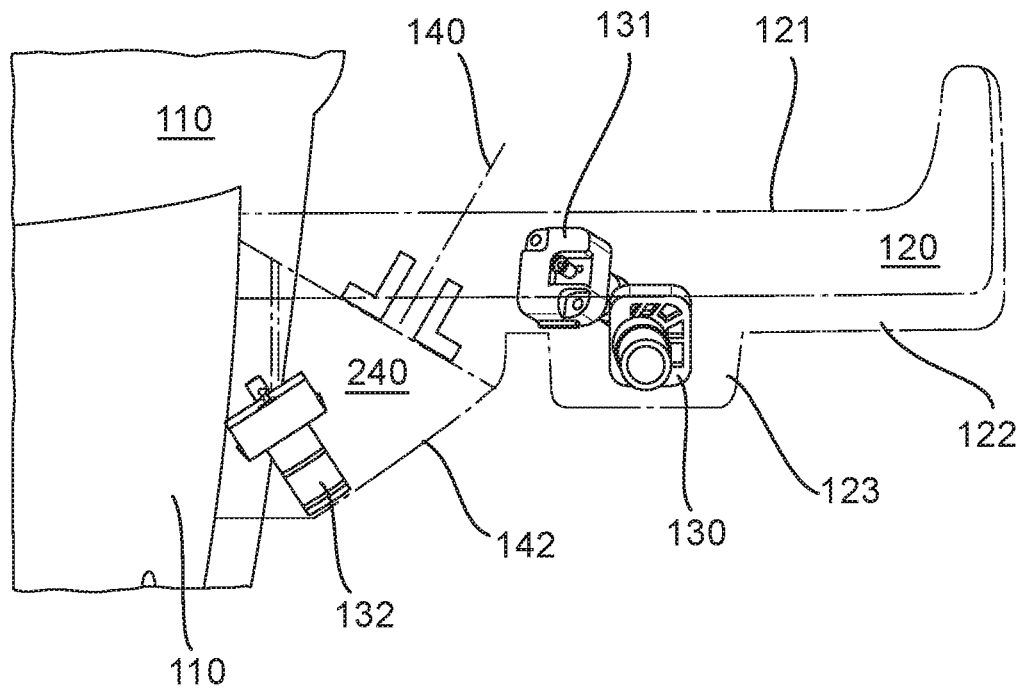
FIGS. 3a and 3b show a base mount and a hanging hinge mount respectively.
Figure 3B:
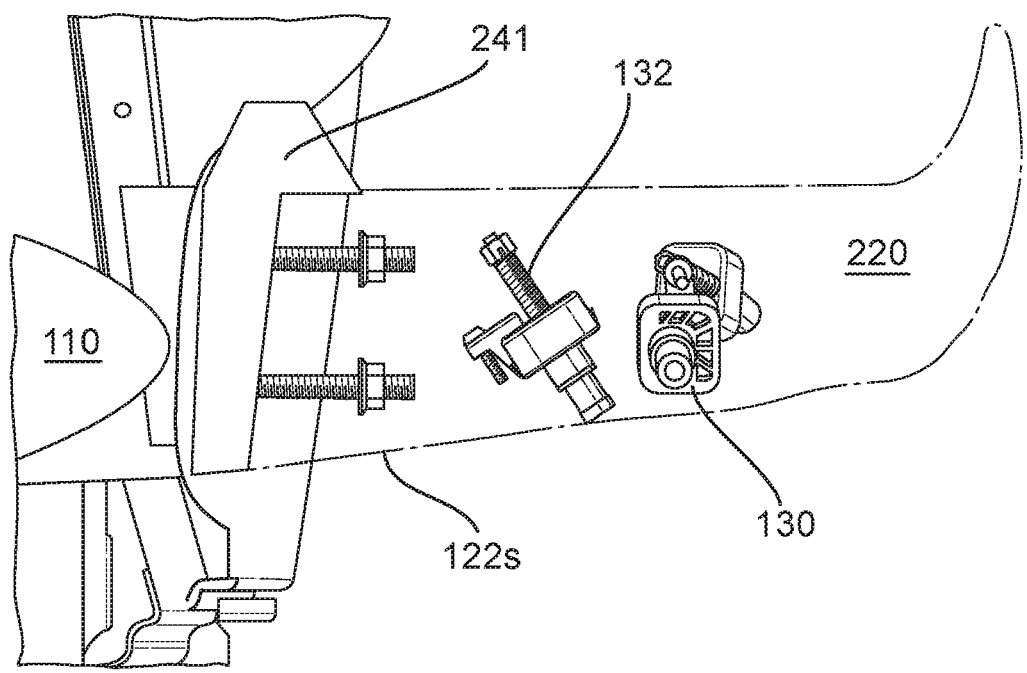

The hinge 240 has a fixed part 142 that is fixed to the vehicle's side 110, and a further downward looking camera 132 is provided in the fixed part 142. The wing assembly 120 may additionally provide room for housing a rearward looking camera 131. The hinge rotational axis is preferably oriented at an angle with the vehicles side 110, in particular, the vertical direction, so that the wing 120 is rotated sideways and upwards when impacted. This rotational orientation minimizes damage since part of the impact energy is diverted by rotating the mirror out of the impact direction. The design of FIG. 3A has a relative advantage over the design of FIG. 3B, in that the hinge mount can be provided more robustly as more coverage area (in the same design space) between the vehicle body on the one hand and rotatable wing on the other hand is available. Furthermore the wing assembly 120 can be designed with a top wing face 121 and an opposed bottom wing face 122. The top wing face has a flatter side than the bottom wing face providing an advantageous aerodynamic design. In addition, the flatter top side can be conveniently provided as a flattened detachable cover (see FIG. 4). In the advantageous design of FIG. 3A, the flat wing assembly 120 has a bottom wing face 122 and a protruding portion 123 protruding from the bottom wing face 122. The protruding portion 123 has a front side that is partly formed by the transparent camera portion of the forward looking camera 130. As will be discussed here below, the flat wing shape minimizes hindering or stalling of the travel wind speed, so that optimal wind speeds are provided for redirecting air flow in a downward direction along the camera 130.

The front portion extends forward beyond the transparent camera portion surface, so that a curved guidance surface is formed by the front portion that redirects impacting travel wind from the front portion to a downward direction along the transparent camera portion to keep it free from contamination. The top hinge mount design 241 of FIG. 3B leaves a bit more room for flattening the wing shape 122$s$ to the side of the vehicle 110, which optimizes the wind speed below the wing shape due to the increase passage way directly sidewards to the vehicle. This can be used as a trade off for increasing the height of the wing assembly 220, that may additionally house a downward looking camera. However, a larger extension in height will generally reduce the impacting wind speeds near the forward looking camera 130. The hinges 240, 241 of FIGS. 3A and 3B both preferably comprise openings for passing through camera and telemetry cables so that a compact design is provided for the hingable wing assembly 120, 220.

In a further embodiment illustrated in FIG. 4, the wing assembly 120 is top surface 121 provided as a detachable cover plate. This has the benefit of easy servicing and installing of the telemetry, for example when adjusting the camera system to a specific vehicle, or when repair is needed. The cover plate 125 forming the top wing face can be mounted by clamping lids. In an embodiment the lids may slide in a correspondingly shaped groove provided in the lower part 124 of the wing assembly. Alternatively, clamping hooks 127 may seize a corresponding clamp arranged in the bottom portion. The lids 128 and the grooves may be designed such that the cover is clamped with sufficient downforce when in mounted position, so that water ingress is prevented. An elastic sealing rim (not shown) which is effectively compressed by this down force may further prevent water ingress. Preferably, the cover 125 is mounted by non conductive parts, e.g plastic screws or a clamping hook 127, alternatively or in addition to lids 128, to prevent interference with one or more digital communications antennas that may be mounted in the wing assembly 120. In case of application of fastening screws the mounting orientation may be chosen favorably in horizontal or lateral direction (in parallel to the wing cover plate) e.g one at the winglet from inside to outside and one or more at the hinge side (the latter screws may be steel based as no interference with the communication antenna signal transmission performance is present). The advantages of such a screwing system (not shown in FIG. 4) are that the probability of water ingression is further reduced and no direct visual view on this screw spots is possible while standing on the ground outside the vehicle. Moreover this horizontal screwing system supports driving the top cover plates in its clamping lids effectively increasing the down force that connects the wing shells (i.e. body and cover) together and compresses the elastic sealings.

In preferred embodiments shown in FIGS. 4 and 5 the wing assembly 120 has an upstanding side portion 150 that houses the one or more digital communications antennas 160, 161. Conversely, the side portion 150 could be designed as a profile pointing downward or a profile that points in a direction at an angle β relative to the horizontal plane H of the bottom portion of the wing.

Figure 5A:
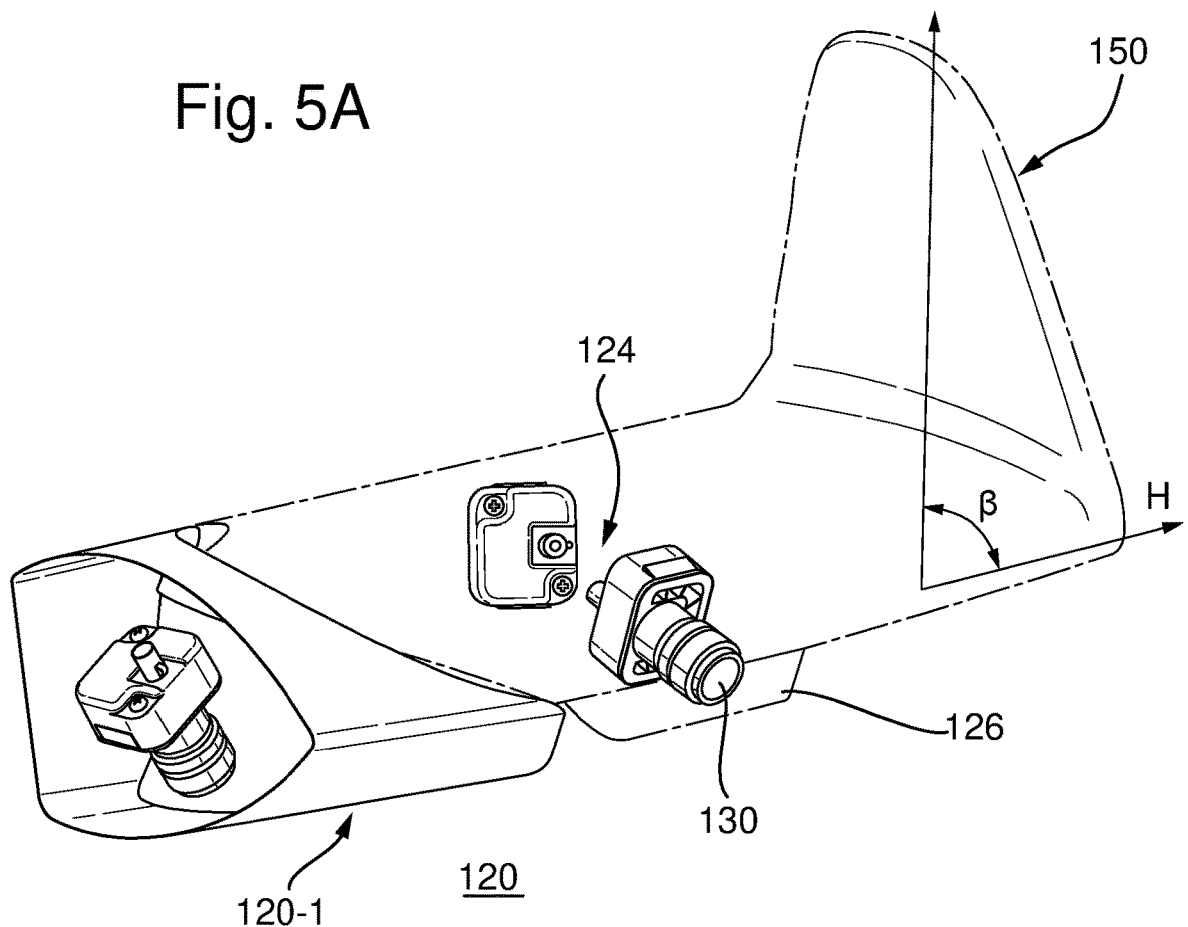
FIG. 5 shows an embodiment showing a wing assembly with communication antennas mounted in a winglet part.
Figure 5B:
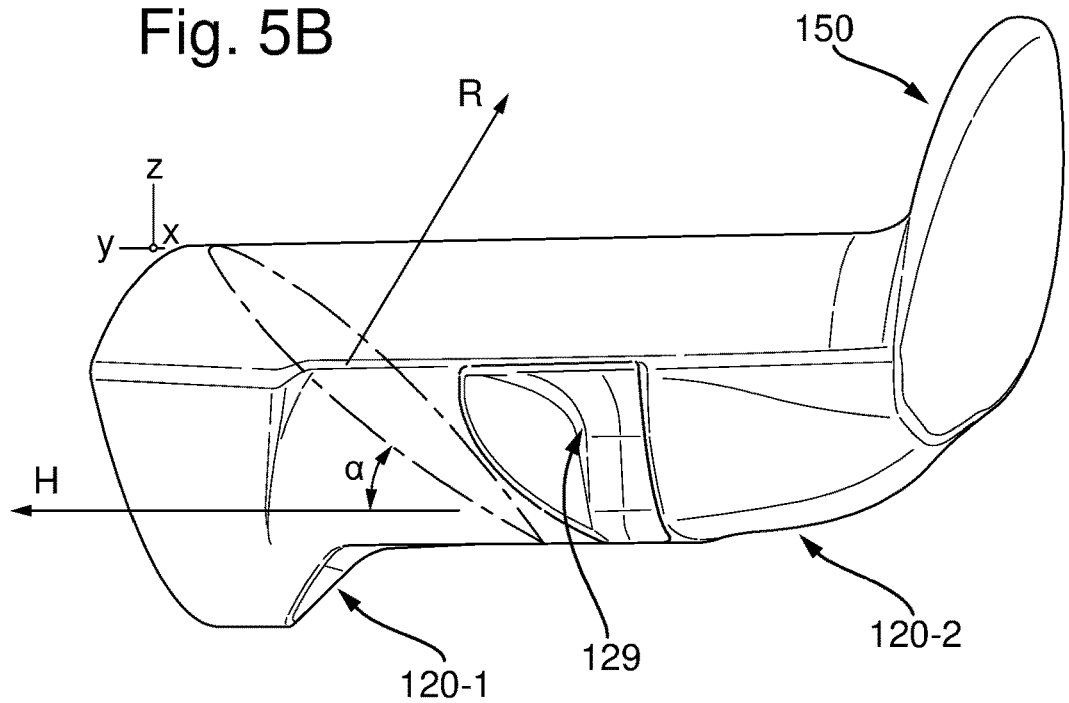

In the shown embodiment of FIG. 5a the upstanding side 150 is shown as a 'winglet'. In the embodiment of FIG. 5A the forward looking camera 130 is mounted in a protrusion 126. In the alternative embodiment of FIG. 5B the forward looking camera 130 is mounted without a protruding portion, but in the rear of a depression 129 in the wing profile shaped as a venturi, that is further discussed with reference to FIG. 11. In the shown embodiments, preferably the hinge rotational axis R is oriented at an angle α with the vehicles side, in particular, the vertical direction V, so that the wing 120 is rotated sidewards and upwards when impacted. A plane normal to the axis of rotation of the hinge may typically intersect the wing assembly at an angle α of 40-65, preferably 45-50 degrees with the vertical V as shown in FIG. 5B. Via this measure the plane cuts the shape in two halves from top to bottom avoiding complex intersections to accommodate clash-free folding between the cabin support structure (120-1) and the rotating wing part (120-2). Such a design is beneficial to obtain a smoothly styled (without local interruptions in the hinge area) and aerodynamically optimized shape of the complete wing assembly in neutral position. The wing assemblies of FIGS. 4 and 5 are designed with a side portion 150 shaped as a winglet, that on the one hand provides for a flat wing geometry, increasing the air flow speed in front of the camera 130, but at the same time providing sufficient vertical and horizontal space to provide for a housing of the antennas. Alternatively, the antenna's 160, 161 are placed in the body 124 of the wing assembly 120, but this increases the vertical extension of the wing shape. Also the winglet shape may aerodynamically enhance the air flow speed around the protruding portion 126 as it stabilizes the air pressures above and underneath the wing thereby positively contributing to a stable homogeneous laminar airflow in the inlet and front portion area of the forward looking camera. In a further advantageous embodiment, the winglet is angled relative to the length orientation of the vehicle, e.g. diverges from the vehicle in the rearward direction.

Figure 6:
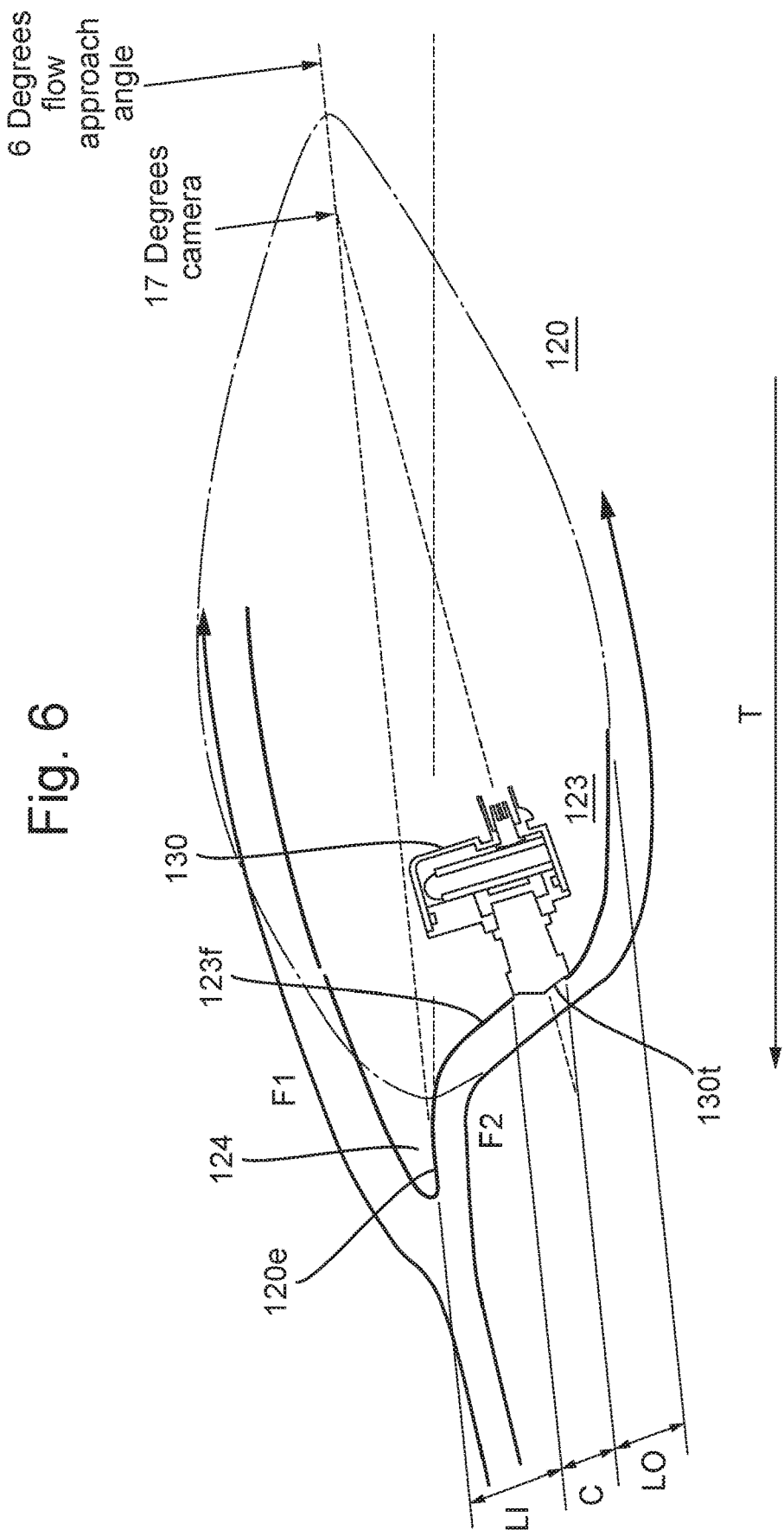
FIG. 6 shows a first schematic cross section of a forward looking camera mounted in a wing assembly indicating the trajectories of moving air.

In more detail, shown in FIG. 6, the wing assembly 120 has a front portion 123f, looking forward in the travel direction T and shaped around and extending in front of a transparent camera portion that forms the front side of the forward looking camera 130, so that the transparent camera portion 130t forms a smooth and continuous surface with the front portion 123f. While other embodiments may provide for non-planar camera fronts, e.g. shaped in a curved and aerodynamic fashion following a curved wing geometry of the protrusion 123, in an advantageous embodiment the transparent camera portion 130t is provided with a flat planum, possibly provided with a dirt repellent coating. The flat geometry of camera portion 130t minimizes ghost images and artefacts, that could arise due to an asymmetric curved shape of the front portion of the camera 130. Moreover a flat transparent geometry contributes to a camera assembly that is easy to construct at low cost and requires les complex imaging software to reconstruct the actual dimensions of the spotted vision distorted objects. Furthermore, advantageously, the forward looking camera 130 has an additional downward angle, to focus on the area directly in front of the vehicle and ensuring sufficient coverage of the lines on the road far away in front of the vehicle (theoretically beyond the horizon) all related to making maximum use of the (vertical) camera opening angle ("view cone"). Typical ranges of the downward angle, relative to the horizontal, could be 10-25 degrees, preferably, 15-20 degrees. Furthermore, to optimize the wing assembly 120 to the impacting travel wind direction that is moderately lifted in upward direction (from vehicle front to back) as result of the vehicle shape, the wing shape is oriented in downward direction (from back to front of the vehicle), due to the rising of the wind sideways of the truck at the high location of the side wings above the ground and close to the roof edge of the cabin. Typical angles may be in a range of 3-10 degrees, preferably around 5-7 degrees approach angle of the wing assembly 120. In the depicted embodiment, the approach angle is 6 degrees downward, and the camera looks 17 degrees downwards relative to the horizontal. In addition to causing a vertical upwards lift of the impacting travel wind, the shape of the vehicle also pushes the travel wind away in lateral direction when passing by the front edges of the vehicle body resulting in an local bended air flow (denoted as yaw angle defined in the horizontal plane and rotated with respect to the longitudinal center axis of the vehicle). In case of commercial vehicles the cabin shape typically causes a yaw angle of the impacting travel wind that is in the range of 5 to 35 degrees. As a consequence the cross section of the wing assembly 120 as shown in FIG. 6 is rotated around the vertical axis into the direction of this bended driving wind in order to optimize the overall aerodynamic design of the wing assembly. In the depicted embodiment this yaw rotation angle (not shown) may amount to ca. 25 degrees but other angles are possible, e.g. 5-35 degrees. As an example of a practical consequence of this optimization measure the protrusion shape orientation according to the wing assembly embodiment as explained in FIG. 9 could favorably rotated with this typical yaw angle. This also applies to the venturi based setup of the wing assembly according to FIG. 11

The wing assembly 120 accordingly has front portion 123f shaped around and extending in front of transparent camera portion 130t that forms the front side of the forward looking cameral 30. The transparent camera portion 130t forms a smooth and continuous surface with the front portion 123f. In the illustrated embodiment the front portion 123f extends forward in the travel direction T beyond the transparent camera portion surface 130t, so that a curved guidance surface is formed by the front portion that redirects impacting travel wind F2 which passes underneath the wing assembly from the front portion 123f to a downward direction. In this way the flow F2 is diverted to follow the curved guidance surface of the front portion 123f along the transparent camera portion 130t in parallel fashion to keep it free from contamination. By the geometry, an extending 'eyebrow' portion 120e is formed, that provides the splitting edge for the impacting travel wind F, directing it up (indicated by F1) or downwards (indicated by F2) from the wing assembly 120. This eyebrow portion 120e has a further advantage of blocking glare of sun reflections or low sun rays and forms a lead in surface for the curved guidance surface of front portion 123f. To optimise the aerodynamic design of the cross section it is important that air flow above F1 and underneath F2 the wing stays attached as much as possible to the surface of the wing (laminar flow) and consequently avoid any unstable turbulences near the front portion area 123*f*. This can best be achieved by limiting the vertical height of the cross section of the wing shape. For this purpose the upper contour of the wing that guides the air flow F1 over the wing is designed as flat as possible, not causing any unnecessary obstructions that may resist the wind passing by. This effect will be explained in more detail with the discussion of FIG. 10 underneath. With respect to optimize the airflow F2 underneath the wing preferably, a height extension of the lead in portion LI is 20-150% of the height extension C of camera portion 130*t*. A lead out extension LO is preferably smaller than both the lead in and the transparent camera portion, e.g. 10-30%, to curve the impacting travel wind F2 in rearward direction and keep wind speeds high along the transparent camera portion 130*t*. In an optimal embodiment of the wing assembly the inlet extension LI is typically larger and the outlet extension LO is typically smaller than height extension C of camera portion 130*t*.

FURTHER EMBODIMENTS

FIG. 7 shows an alternative wing geometry wherein an eyebrow portion has a lead extension LI and a lead out extension LO of similar proportions as depicted in FIG. 6. The height of the wing shape in FIG. 7 is larger to accommodate for instance a vertical downward looking camera and/or antenna hardware (not shown). The camera may be formed integrally in the wing shape, or may form a protruding part 123, as shown in the insert of FIG. 7.

Figure 8:
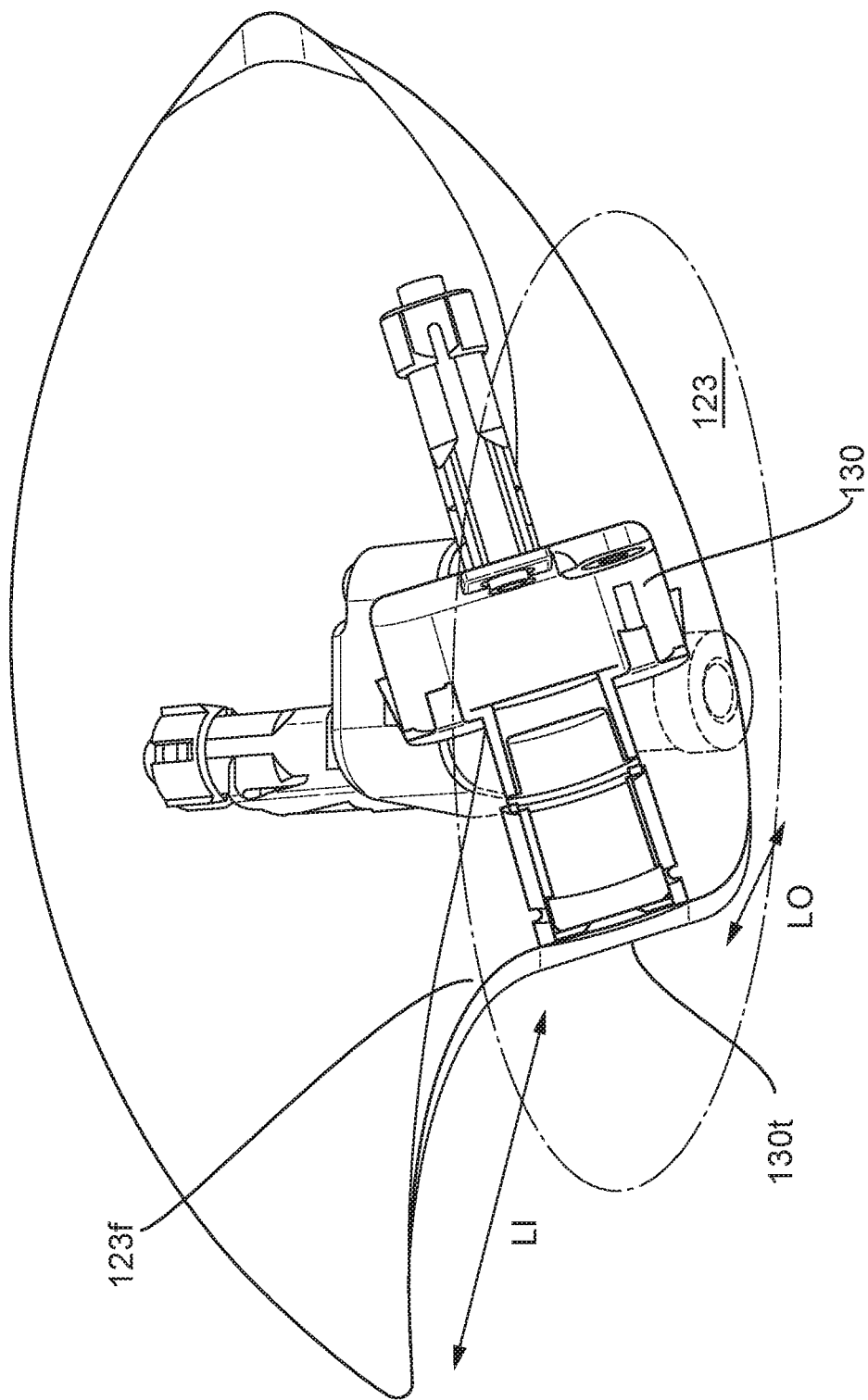
FIG. 8 shows a third schematic cross section of a forward looking camera mounted in a wing assembly.

FIG. 8 shows a geometry similar to FIG. 6, with a longer lead in LI of the front portion 123*f*, enhancing the redirection of the travel wind in downward direction. The lead out is similar, and is limited in extension to promote acceleration of the wind speed near the bottom edge of the protrusion 123. The embodiment is shaped to additionally house a downward looking camera 132. As a consequence the aerodynamic optimization of the cross sectional height of the wing assembly is limited by the height dimensions of the downward looking camera. Depending on the dimensions of this camera, the top cover may be designed with a curvature which has a tendential adverse influence on the desired camera lense cleaning mechanism effect (related to high parallel wind speed) as explained above.

Figure 9A:
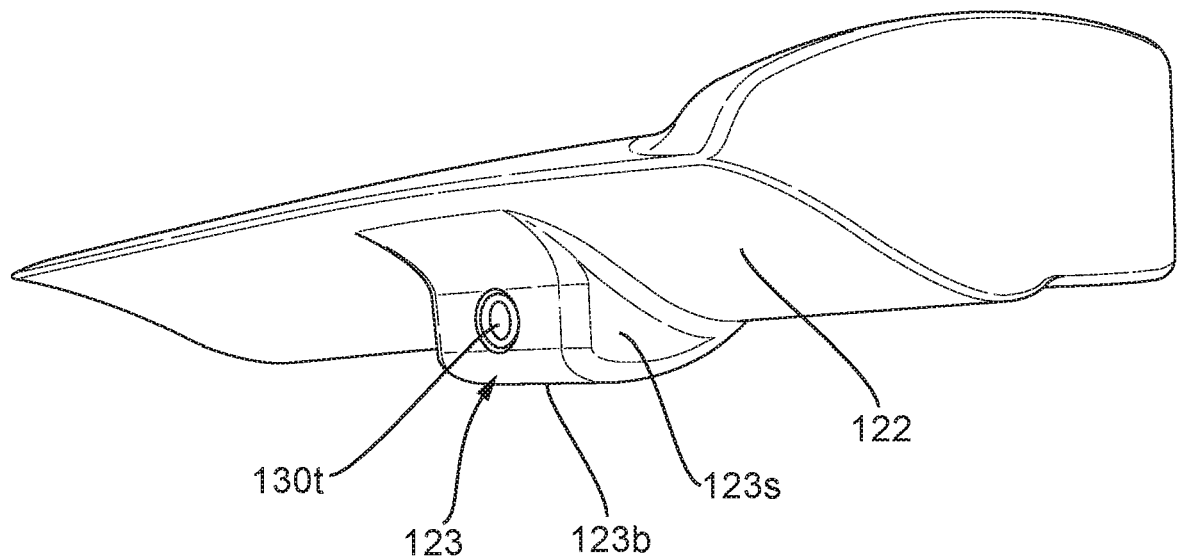
FIGS. 9A and 9B show a fourth embodiment with a cross section of a forward looking camera mounted in a wing assembly.
Figure 9B:
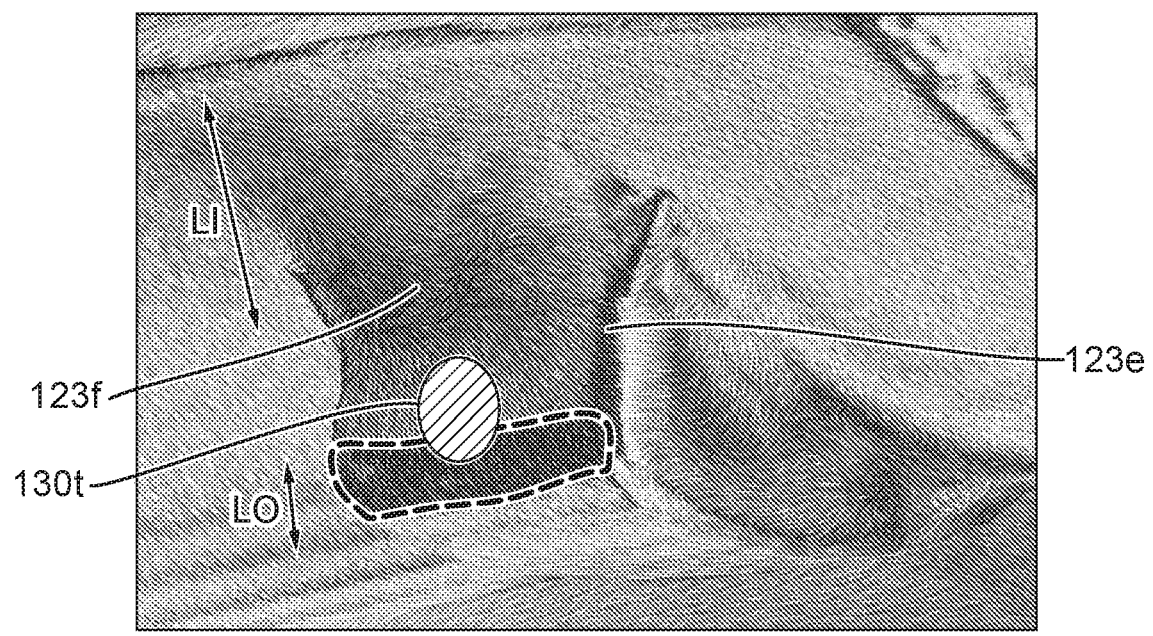

FIG. 9 shows a further advantageous embodiment wherein the protruding portion 123 has a bottom wall 123*b* and a side wall 123*s* extending between the bottom wall 123*b* and the bottom wing face 122 and forming a lead surface LI for directing wind traveling downward along the transparent camera portion 130*t* in rearward direction. FIG. 9B shows a corresponding shear stress profile at the surface of the wing assembly (zoomed in at the protrusion 123) in the direct vicinity of the transparent camera portion 130. Shear stress relates to frictional forces acting on the surface of the wing assembly. The higher these frictional forces are in the transparent camera portion 123*t*, the more power is available to push water droplets and dirt particles away (in downward direction) from the transparent camera lense. As a result the self cleaning mechanism will perform best. Shear stress is quadratically proportional to air speed which means that fairly little increases in air speed yield significant improvements of the self cleaning mechanism. It can be seen that the shear stress is relatively low in the lead in LI the front portion 123*f*, and increases towards the lead out/edge of the protruding portion 123, curving the flow in rearward direction. It can be seen that the side walls have the aerodynamic function of increasing the wind speed near the side edges 123*e* of the sidewalls 123*s*. This increases the local wind speed along the surface of the transparent camera portion 130*t*.

Figure 10A:
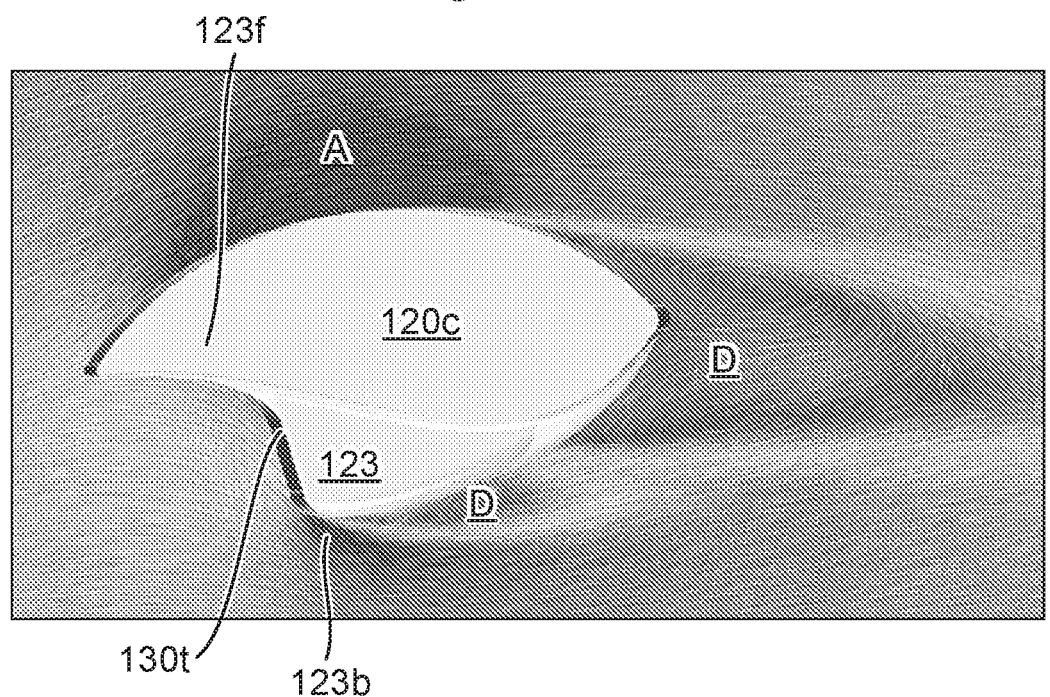
FIGS. 10A and 10B show wind speed profiles of a second and third embodiment.
Figure 10B:
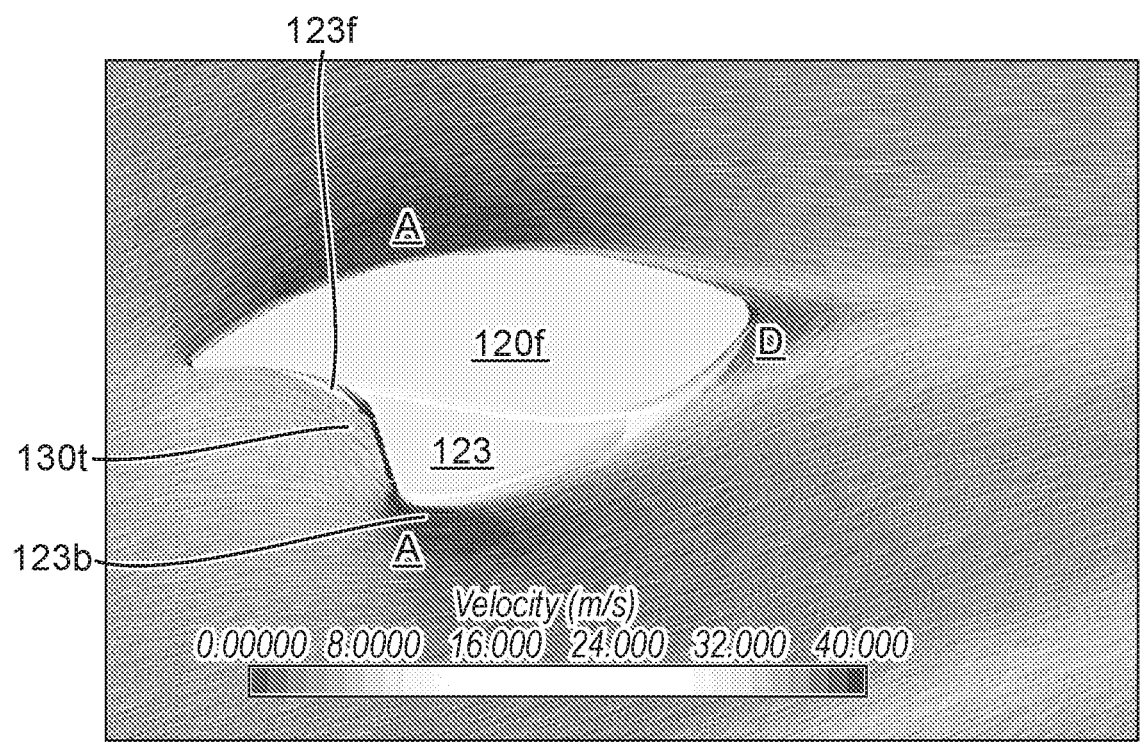

FIG. 10 shows a comparison of wind speed profiles of a wing shape 120*c* and 120*f*. Wing shape 120*c* as depicted in FIG. 10A is more curved than the flatter shape 120*f* of FIG. 10B. Comparing the flat wing design 120*f* of FIG. 10B, the wind speed profile of the curved wing design 120*c* of FIG. 10A has low speed zones (indicated by area D) considerably extending behind and below the protruding portion 123 which has a negative effect on the maximization of local air speed near the transparent camera lens portion 130*t* (particularly in the edge below the camera lens towards the bottom wall of the protrusion 123*b* indicated by area A). In FIG. 10B the high speed zone A below the bottom wall 123*b* is significantly larger and extending more into the transparent camera portion 130*t*. Clearly visible in FIG. 10B is also that the low air speed zone D is only present in a small area behind the wing assembly far away from the forward looking camera lens and maximally contributing to a laminar air flow above and below the wing assembly all contributing to lowering the risk of early air separation along the wing contours. This clearly illustrates the advantage of a flat wing design where preferably the downward looking camera is mounted outside the wing, more preferably in the hinge part. This results in a flat design of the wing assembly 120*f* with increased air speed near the bottom part of the protruding portion, and a corresponding higher wind speed near the transparent portion 130*t* of the camera.

Figure 11A:
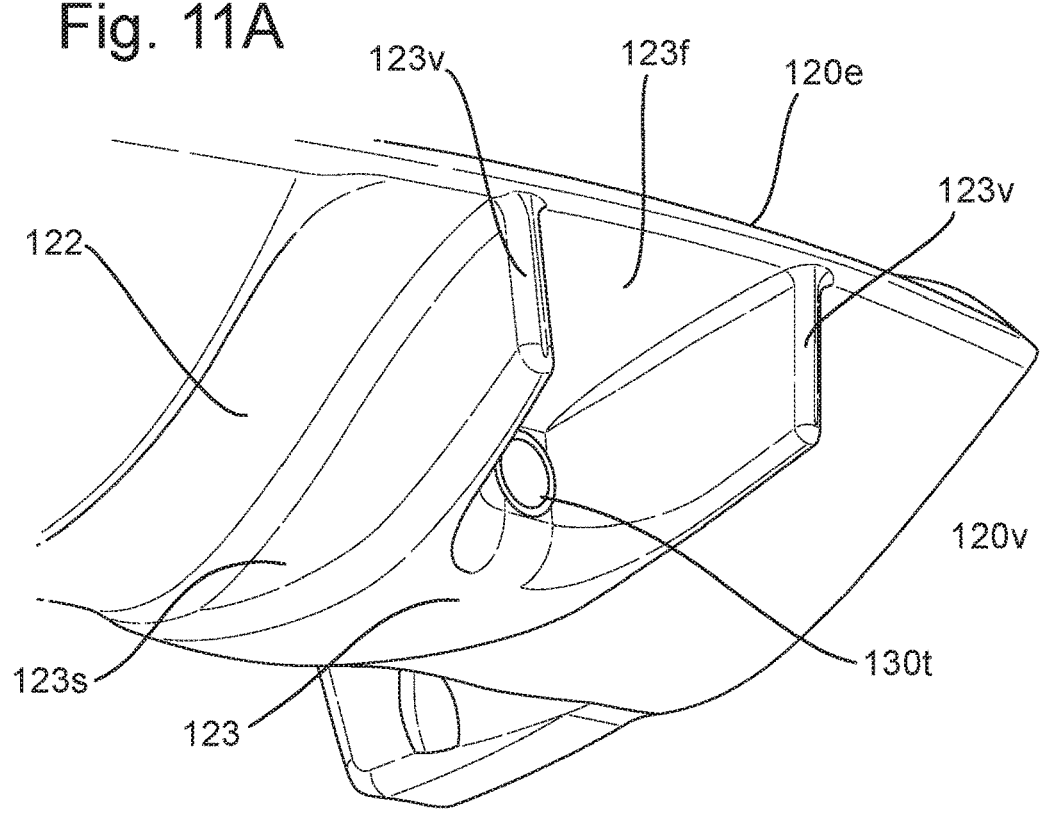
FIGS. 11A and 11B show a fifth embodiment with a venturi construction placed in front of the forward looking camera.
Figure 11B:
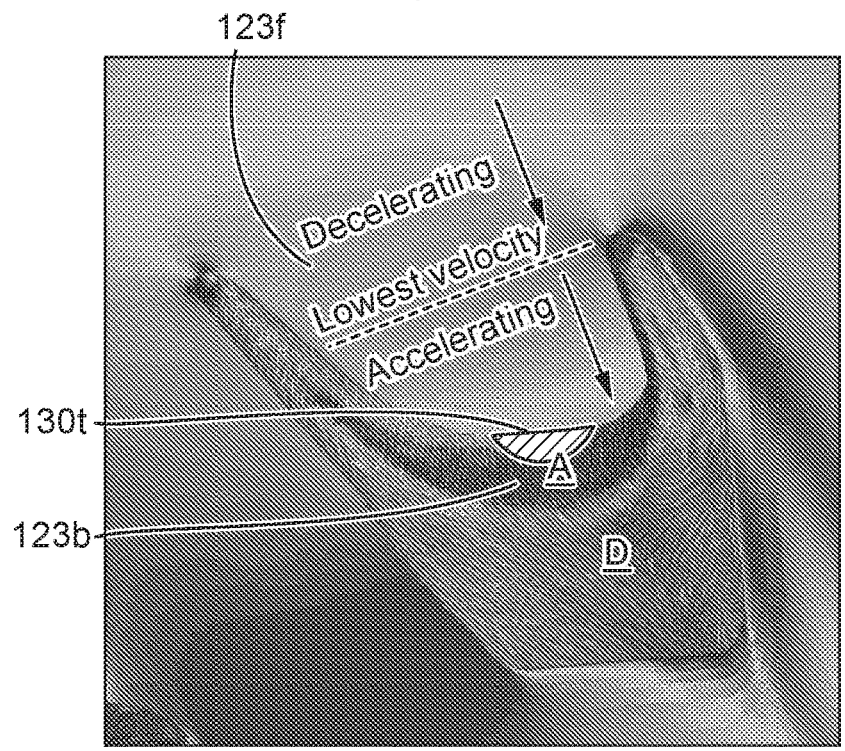

FIG. 11A shows a further variation of the design, wherein the protrusion 123 has extending wall parts 123*v* extending downwards and below the bottom wing face 122 and extending, seen relatively from the camera portion 130*t* towards the front side 120*f* of the wing 120*v*, said extending wall parts 123*v* converging in rearward direction to form a venturi for robustly catching and accelerating travel wind impacting the front portion 120*f* and diverting it at high speed along the transparent camera portion 130*t*. In FIG. 11, the venturi shape precedes the protrusion 123 with wall portions 123*v*. Not shown in the figure, additionally a lateral slat may be provided, that directs incoming wind in upward direction against the bottom wall part of the wing, thereby further increasing incoming wind flow in the lead in area of the front side. FIG. 11B shows the velocity profile of air flow in the horizontal plane halfway through the transparent camera lens portion 130*t* as well as the resulting shear stress profile acting at the surface of the protrusion 123*b* underneath the camera lens. Due to the impact of the travel wind against the front portion 123*f*, in the initial area of guidance surface, i.e. the lead in area, a decrease of air speed is present, leading to a local minimum wind speed. This point of 'lowest velocity' (indicated by the dashed borderline) is located substantially above and in front of the transparent camera portion 130*t*. From this point on the wind speed is accelerated, when it passes inside through the venturi, over a certain stroke that corresponds to the length of the eyebrow portion 120*e* (front portion lead edge) such that it is speeded up in the order of 80-150% of the vehicle speed of travel when it finally passes the transparent camera portion 123*t* (in parallel). In FIG. 11B is also clearly visible that the high shear stress zone at the front below edge 123*b* is now effectively moving into the transparent camera lens portion 130*t*, greatly contributing to a maximization of the self cleaning mechanism. Additionally extending wall parts 123*v* may form side walls 123*s* of the protruding portion 123. Alternatively, the extending wall parts 123 may form an isolated structure that precedes the camera portion 130*t*. In a further advantageous embodiment, the inner side walls 123v are angled relative to the length orientation of the vehicle, that is, the inner side walls 123v have a dominant length direction that is angled, e.g. converges towards the vehicle in the rearward direction forming a V-shaped venturi. The orientation of the complete venturi, in combination with the protrusion behind it, may be designed with presetted yaw angle (e.g. 5-35 degrees) as explained in the discussion of the embodiment according to FIG. 6. To provide further wind speed acceleration, the side walls may also converge away from the bottom wing face 122 in downward direction.

FIGS. 12A and 12B show comparative velocity profiles of the transparent portion, with (B) and without (A) the venturi shape similar to the embodiment of FIG. 11A. It is shown that the velocity profile with the venturi shape substantially increases the wind velocity in the portion up and above the transparent camera portion, so that the guidance surface formed by the front portion 120f redirects with enhanced efficiency the impacting travel wind from the front portion 120f to a downward direction along the transparent camera portion 130t to keep it free from contamination.

FIG. 13 shows an alternative embodiment in bottom view of a truck side 110, A camera is integrated in a wing profile, without a protruding portion. Due to the venturi profile of inner walls 123v-1, 123v-2, the camera lens portion 130t is kept free from contamination. In the preferred embodiment, the inner walls 123v forming the venturi shape align in different directions relative to the truck. That is, an inner wall 123v-1 closest to the truck side 110 has a slant orientation relative to the trucks length direction of e.g. 30-50 degrees, relative to the truck's length direction L. The other inner wall 123v-2 further away from the truck side 110 is oriented substantially in the trucks length direction L, and may have a deviation of about +/−10 degrees.

Figure 14A:
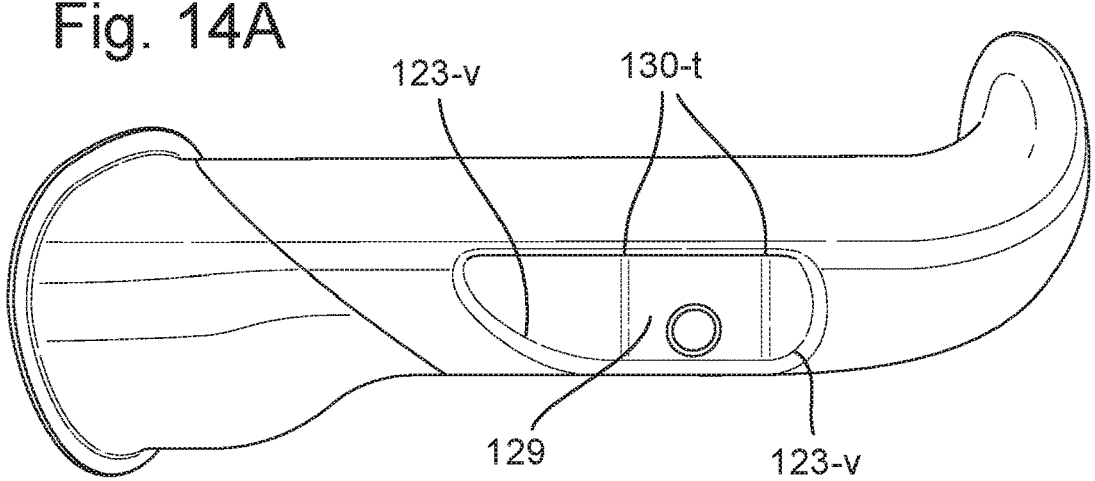
FIG. 14 shows a further embodiment with a venturi profile in front view and bottom view.
Figure 14B:
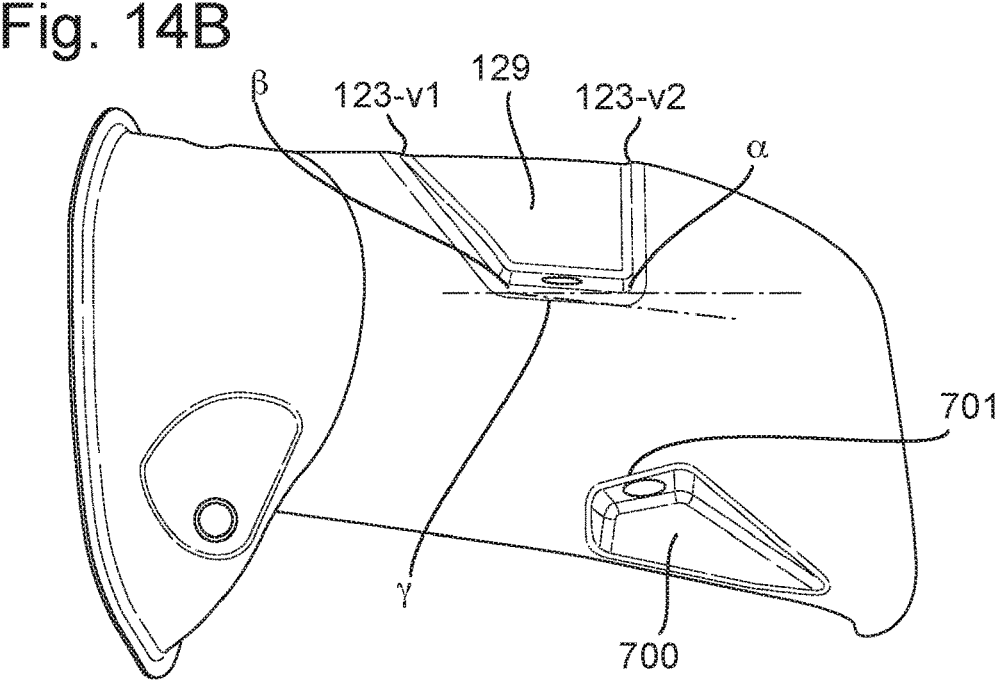

FIG. 14 shows further embodiments of an application with a venturi shape without the installation of a pronounced protrusion underneath the wing, with corresponding elements indicated. Such a design gives more freedom to package components like camera and cable routing into the wing assembly and tune the overall shape in terms of smooth styling and optimization of aerodynamic drag. The inner wall of venturi 129, shaped as a depression 129 within the wing profile has inner wall 123v-2 at an angle α with the trucks lateral axis, typically at angles ranging between 80-100 degrees. The inner wall 123v-1, closest to the truck is with an angle β of about 30-50 degrees, in the shown embodiment at angle 45 degrees. In the design of FIG. 14B, the rearward looking camera is provided in a further depression at the rear of the wing shape with a more or less rectangular shape that facilitates free vision of the camera towards the back end of the truck trailer combination. The depression also provides an anti-glare feature in rearward direction.

Figure 14C:
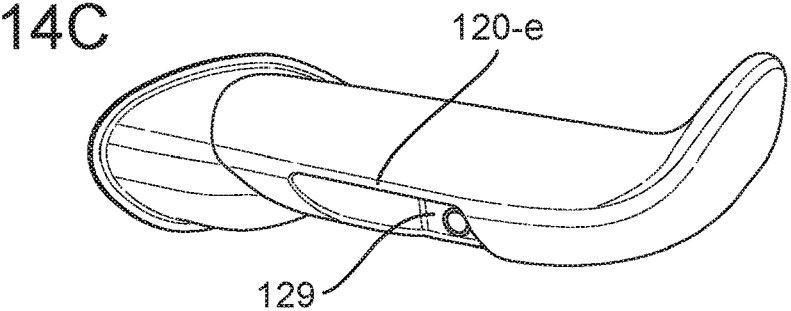

FIG. 14C shows the design with front-eyebrow portion 120e to provide anti-glare (against sunlight) function in forward looking direction. The aligned orientation of depressions 129 and 700 is able to provide a laminar flow that reaches the lower edge of the depression portion 700 of the rearward looking camera. Designing this edge 700-1 with a fairly sharp bending radius between the bottom wing surface and the (perpendicular) plane of the camera lens allows the laminar air flow to separate at this last point of the bottom guiding surface of the wing and consequently allow the wind freely passing by the (static) air that is inside in the depression portion 700. This helps to keep the rear camera clean and avoid drastic turbulences in this area.

The invention claimed is:

1. A camera system arranged for mounting on a vehicle's front side location, equipped to provide at least an image of the area in front of the vehicle, the camera system comprising:
   a wing assembly arranged for mounting on the vehicles front side location; and
   a forward looking camera mounted in the wing assembly, wherein the wing assembly has a front portion shaped around and extending in front of a transparent camera portion that forms the front side of the forward looking camera, such that the transparent camera portion forms a smooth and continuous surface with the front portion;
   wherein the front portion extends forward beyond the transparent camera portion surface, so that a curved guidance surface is formed by the front portion that redirects impacting travel wind from the front portion to a downward direction along the transparent camera portion to keep it free from contamination.

2. The camera system according to claim 1, wherein the transparent camera portion is provided with a dirt repellent coating.

3. The camera system according to claim 1, wherein the wing assembly has a top wing face and an opposed bottom wing face; wherein the top wing face has a flatter side than the bottom wing face.

4. The camera system according to claim 1, wherein the wing assembly has a bottom wing face and a protruding portion protruding from the bottom wing face, which protruding portion has a front side that is partly formed by the transparent camera portion of the forward looking camera.

5. The camera system according to claim 4, wherein the protruding portion has a bottom wall and at least one side wall extending between the bottom wall and the bottom wing face positioned besides the transparent camera portion thereby forming a lead surface for accelerating wind traveling downward and partially sideward along the transparent camera portion in rearward direction at high speed.

6. The camera system according to claim 1, further comprising inner wall parts extending in front of the transparent camera portion downwards from the bottom wing face and towards the front portion, said inner wall parts converging in rearward direction to form a venturi for accelerating travel wind impacting the front portion and directed along the transparent camera portion.

7. The camera system according to claim 6, wherein the venturi is provided with a horizontal slat for directing air towards the front portion.

8. The camera system according to claim 6, wherein the inner wall parts are oriented non-symmetrically relative to the truck length direction.

9. The camera system according to claim 5, wherein the inner wall parts are angled relative to the length orientation of the vehicle.

10. The camera system according to claim 9, wherein the inner wall parts are angled relative to the vertical orientation of the vehicle.

11. The camera system according to claim 1, wherein the wing assembly comprises a hinge mount that hinges the wing shaped assembly in forward and rearward traveling directions.

12. The camera system according to claim 11, wherein the hinge has a fixed part that is fixed to the vehicle's side, and wherein a further downward looking camera is provided in the fixed part.

13. The camera system according to claim 11, wherein the hinge has a base part, that comprises openings for passing through camera and telemetry cables.

14. The camera system according to claim 1, wherein the wing assembly houses a rearward looking camera.

15. The camera system according to claim 14, wherein the wing assembly has a bottom wing face and a protruding portion protruding from the bottom wing face, which protruding portion has a front side that is partly formed by the transparent camera portion of the forward looking camera, and wherein the rearward looking camera is provided in the protruding portion.

16. The camera system according to claim 1, wherein the wing assembly houses one or more digital communications antennas.

17. The camera system according to claim 16, wherein the wing assembly has a side portion that houses the one or more digital communications antennas.

18. The camera system according to claim 16, wherein the digital communication antennas are Wifi antennas for a vehicle-to-vehicle communication system.

19. The camera system according to claim 16, wherein the side portion is shaped as a winglet.

20. The camera system according to claim 1, wherein the wing assembly is provided with a detachable cover plate, and wherein the cover plate is fixed to the wing assembly by clamps.

* * * * *